(12) United States Patent
Lebsock

(10) Patent No.: US 9,108,601 B2
(45) Date of Patent: Aug. 18, 2015

(54) TRAILER BRAKING SYSTEM FOR USE WITH A FIFTH WHEEL/GOOSENECK HITCH HAVING A SURGE BRAKE ACTUATOR

(75) Inventor: Robert A. Lebsock, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 224 days.

(21) Appl. No.: 13/539,752

(22) Filed: Jul. 2, 2012

(65) Prior Publication Data
US 2013/0213748 A1 Aug. 22, 2013

Related U.S. Application Data

(60) Provisional application No. 61/601,160, filed on Feb. 21, 2012.

(51) Int. Cl.
*B60T 7/20* (2006.01)
*B60T 13/08* (2006.01)

(52) U.S. Cl.
CPC .. *B60T 7/20* (2013.01); *B60T 13/08* (2013.01)

(58) Field of Classification Search
USPC .............. 188/112 R, 112 A, 3 R, 3 H; 303/7; 280/446.1
See application file for complete search history.

(56) References Cited

U.S. PATENT DOCUMENTS

| | | | | |
|---|---|---|---|---|
| 4,082,168 A | * | 4/1978 | Cole et al. | 188/112 R |
| 4,600,089 A | * | 7/1986 | Wilson | 188/112 R |
| 4,726,601 A | * | 2/1988 | Stevens | 188/112 R |
| 5,238,298 A | * | 8/1993 | Wagner et al. | 188/170 |

OTHER PUBLICATIONS

Jessika Toothman, "How Gooseneck Hitches Work," How Stuff Works (dot) com. [available at: http://auto.howstuffworks.com/auto-parts/towing/equipment/hitches/gooseneck-hitches.htm].
"Mobilexhibit MX2000: Surge Braking System," [available at: http://www.mobilexhibit.com/brakes.html].
U-Haul: Truck and trailer details. [available at: http://www.uhaul.com/Reservations/EquipmentDetail.aspx?model=rv].
"DA10 Actuator Owners/Operators Manual" Dethmers Manufacturing Company. [dated "Mar. 25, 1999"].

* cited by examiner

*Primary Examiner* — Melanie Torres Williams
(74) *Attorney, Agent, or Firm* — Eric Brett Compton

(57) ABSTRACT

Methods and apparatuses for a trailer braking system for use with a fifth wheel hitch, a gooseneck hitch, or the like. A braking system for a trailer pulled by a tow vehicle includes an arm member extending downward from and pivotally connected to an upper portion of the trailer and a surge brake actuator connected to the upper portion of the trailer that is configured to control braking of wheels of the trailer. When the tow vehicle decelerates, inertial force caused by forward momentum of the trailer pivots the arm member such that force is exerted on the surge brake actuator to actuate the brakes of the trailer.

20 Claims, 5 Drawing Sheets

TRAILER BRAKING SYSTEM FOR USE WITH A FIFTH WHEEL/GOOSENECK HITCH HAVING A SURGE BRAKE ACTUATOR

CROSS-REFERENCE TO RELATED APPLICATIONS

This application claims priority of U.S. Provisional Patent Application Ser. No. 61/601,160 filed Feb. 21, 2012, which is incorporated herein by reference.

GOVERNMENT INTEREST

The invention described herein may be manufactured, used and licensed by or for the U.S. Government.

BACKGROUND OF THE INVENTION

I. Field of the Invention

Embodiments of the present invention generally relate to a braking system, and in particular, to a trailer braking system for use with a fifth wheel hitch, a gooseneck hitch, or the like, having a surge brake actuator.

II. Description of Relevant Prior Art

Gooseneck hitches use a hitch ball to lock into place, while fifth wheel hitches use a wheel-shaped mounted plate to accomplish the connection.

Unlike regular hitches that generally extend from the back of the tow vehicle to couple to a horizontally-mounted hitch coupler provided on the trailer, gooseneck hitches, and the closely-related fifth wheel hitches, are typically anchored to a hitch on the tow vehicle via a fixed arm member extending downward from an upper portion of the gooseneck trailer. These hitching systems enable the trailers to be able to make tighter turns than the ones that connect off the back of the tow vehicle.

FIG. 1(a) shows a typical gooseneck trailer 140 being pulled by a tow vehicle 150 via a typical gooseneck trailer hitch system 100. Here, the tow vehicle 150 may be a flatbed pick-up truck. FIG. 1(b) shows in more detail the typical gooseneck hitch system 100 which includes a hitch ball 110 mounted to frame rails 120 attached to a tow vehicle 150. The hitch ball 110 may be releaseably mounted to the frame rails 120 by a locking mechanism. The hitch ball 110 couples to a fixed arm member 145 of a trailer 140.

When a fifth wheel or gooseneck trailer is being towed behind a vehicle and the tow vehicle applies its brakes or otherwise decelerates, the trailer may continue to travel forward due to forward momentum of the trailer. This forward momentum causes inertial forces that can damage the hitch, the tow vehicle, and/or the trailer.

BRIEF SUMMARY OF THE INVENTION

Methods and apparatuses for a braking system having a surge brake actuator are described herein according to various embodiments of the present invention.

According to one or more embodiments, a braking system for a trailer pulled by a tow vehicle is described. The braking system may include: an arm member extending downward from and pivotally connected to an upper portion of the trailer; and a surge brake actuator connected to the upper portion of the trailer that is configured to control braking of wheels of the trailer. When the tow vehicle decelerates, inertial force caused by forward momentum of the trailer pivots the arm member such that force is exerted on the surge brake actuator.

According to one or more embodiments, a method for braking a trailer pulled by a tow vehicle is described, in which the trailer has a braking system including an arm member extending downward from and pivotally connected to an upper portion of the trailer, and a surge brake actuator connected to the upper portion of the trailer that is configured to control braking of wheels of the trailer. The method may include decelerating the tow vehicle. When the tow vehicle decelerates, inertial force caused by forward momentum of the trailer pivots the arm member and force is exerted on the surge brake actuator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

DETAILED DESCRIPTION OF THE INVENTION

Embodiments of the present invention relate to a braking system having a surge brake actuator. The braking system may provide a connection between the trailer and the tow vehicle via a fifth wheel hitch, a gooseneck hitch, or the like, in some instances.

The trailer braking system may include an arm member extending downward from and pivotally connected to an upper portion of the trailer; and a surge brake actuator coupled to the upper portion of the trailer that is configured to control braking of the trailer. When the tow vehicle decelerates, inertial force caused by forward momentum of the trailer pivots the arm member such that force is exerted on the surge brake actuator. In some embodiments, the surge brake actuator may include a master cylinder assembly that is configured to output fluid pressure to the trailer wheel brakes which is substantially proportional to the rate of deceleration of the tow vehicle and the mass of the trailer.

In operation, when tow vehicle service applies its brakes or otherwise decelerates, the forward momentum of the trailer causes force to be exerted to the surge brake actuator though pivotal motion of the arm member. This in turn causes braking of the trailer wheels. The arm member, which is coupled to hitch of the tow vehicle, may also transmit the deceleration force of the tow vehicle to the surge brake actuator.

Figure 2:
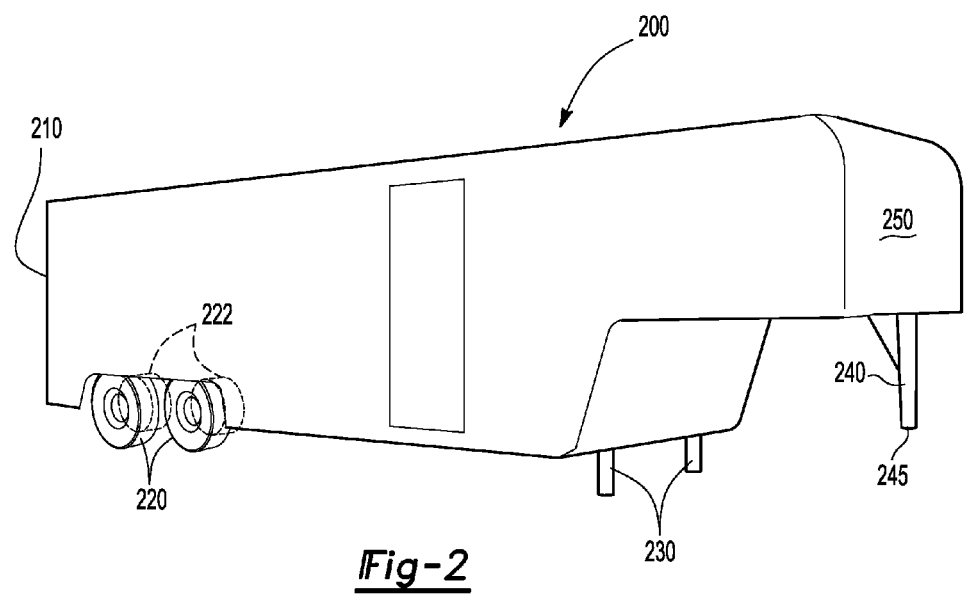
FIG. 2 illustrates a trailer for use with a gooseneck hitch, a fifth wheel hitch, or the like, having a braking system that includes a surge brake actuator in accordance with embodiments of the present invention.

FIG. 2 illustrates a trailer 200 for use with a gooseneck hitch, a fifth wheel hitch, or the like, having a trailer braking system that includes a surge brake actuator in accordance with embodiments of the present invention.

The trailer 200 generally includes a bed 210, wheels 220, and a pair of jack stands 230. The bed 210 may be configured for the particular application, load, or both of the trailer. A closed bed 210 compartment is shown; although, it should be appreciated that the trailer bed may be fully-open, partially-open or generally flat, as known in the art. In addition, the bed 210 may further include one or more doors, windows, vents, ramps, lifts, tail gate, and/or the like. The trailer 200 may have a frame construction including rails, struts, and/or beams with side wall or rails. The various frame members may be coupled together by welding, with fasteners (e.g., bolts) or the like.

The trailer is equipped with wheel brakes 222 for causing rotation of the trailer wheels 220 to slow down or stop altogether. The wheel brakes 222 may be a part of a hydraulic braking system having braking elements, such as, for example, conventional hydraulic drum or disc brakes. When fluid pressure is applied to the wheel brakes 222, the wheel brakes 222 apply a clamping force to the trailer wheels 220 to slow or stop rotation of the trailer wheels 220. Other types or trailer wheel brakes might also be provided in other embodiments.

The trailer 200 includes an arm member 240 that is pivotally connected to an upper portion 250 of the trailer. The arm member 240 may extend substantially vertically downward from the upper portion 250 of the trailer 200. Pivoting of the arm member 240 controls braking of the trailer 200 when the tow vehicle resists forward motion, such as when the tow vehicle decelerates. The greater the pivoting of the arm member 240, the greater the force applied to the surge brake actuator to variably control braking of the trailer wheels 220. On the other hand, when little to no fluid pressure is applied to the trailer wheel brakes, no clamping force will be applied to the trailer wheels 220 and the wheels 220 can rotate freely, and the arm member 240 may be at a generally vertical (i.e., 90 degree) position relative to the ground.

Figure 1:
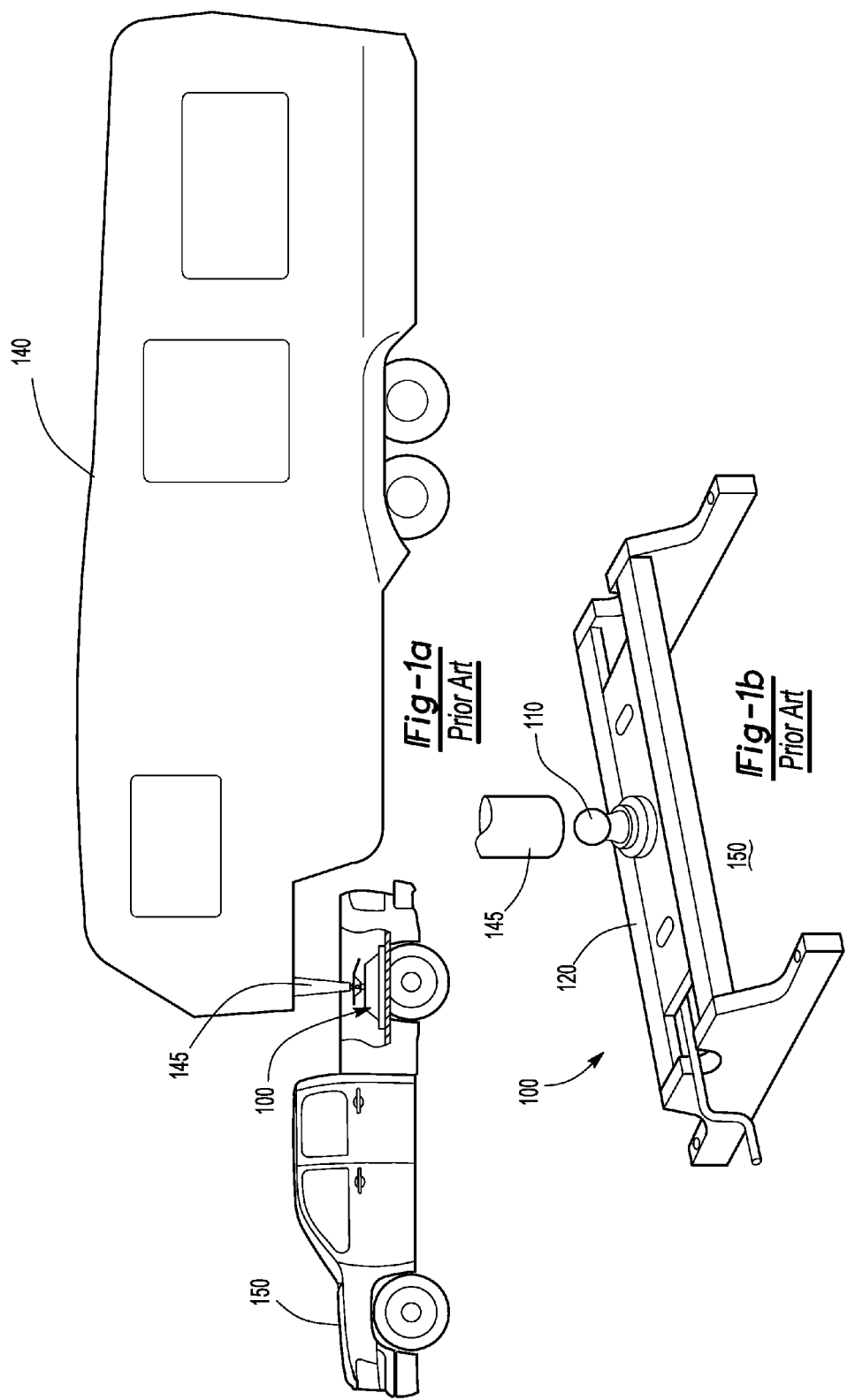
FIGS. 1(a) and (b) illustrate an example of a typical prior art gooseneck trailer being pulled by a tow vehicle and a typical gooseneck trailer hitch system.

The upper end of the arm member 240 depends from an upper portion 250 of the trailer 200 while its lower end includes a hitch coupler 245 that is configured to releaseably couple with a hitch attached to the tow vehicle, such as a ball hitch, a fifth wheel hitch, or the like. The tow vehicle may be a conventional tow vehicle having a hitch mounted thereto. If the tow vehicle is a pick-up truck, the hitch may be mounted in its bed similar as shown in FIG. 1(a), for example.

The trailer 200 may be adapted to transport a specific object, such as, car, boat, all-terrain vehicle (ATV), motorcycle, tractor, farm equipment, construction machinery, materials (e.g., lumber, pipe, beams, etc.), animals (such as horses, cows, livestock, etc.), or the like, for example. Moreover, the trailer may be integrated with or otherwise included with another object, such as a camper, recreational vehicle (RV), mobile command center, or the like, pulled by a tow vehicle. In one embodiment, the trailer may be 34 feet long, insulated, carpeted inside, and having a drop ceiling, an electrical system (e.g., 100 amp. 3 phase electrical system), a reinforced walking roof and guard rails. The trailer 200 may also be equipped with air conditioning, work benches, power cords and connectors, control systems and other amenities, as desired.

Figure 4:
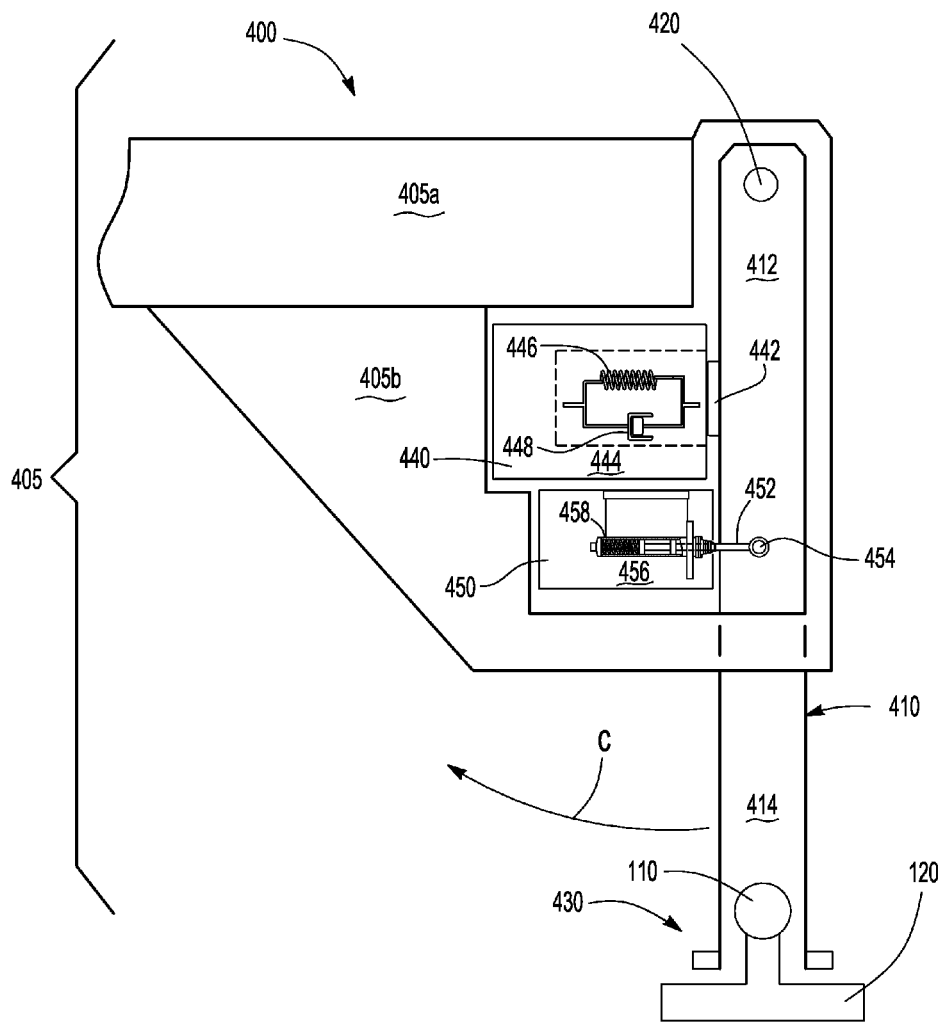
FIG. 4 illustrates a trailer braking system having a surge brake actuator in accordance with embodiments of the present invention.
Figure 5:
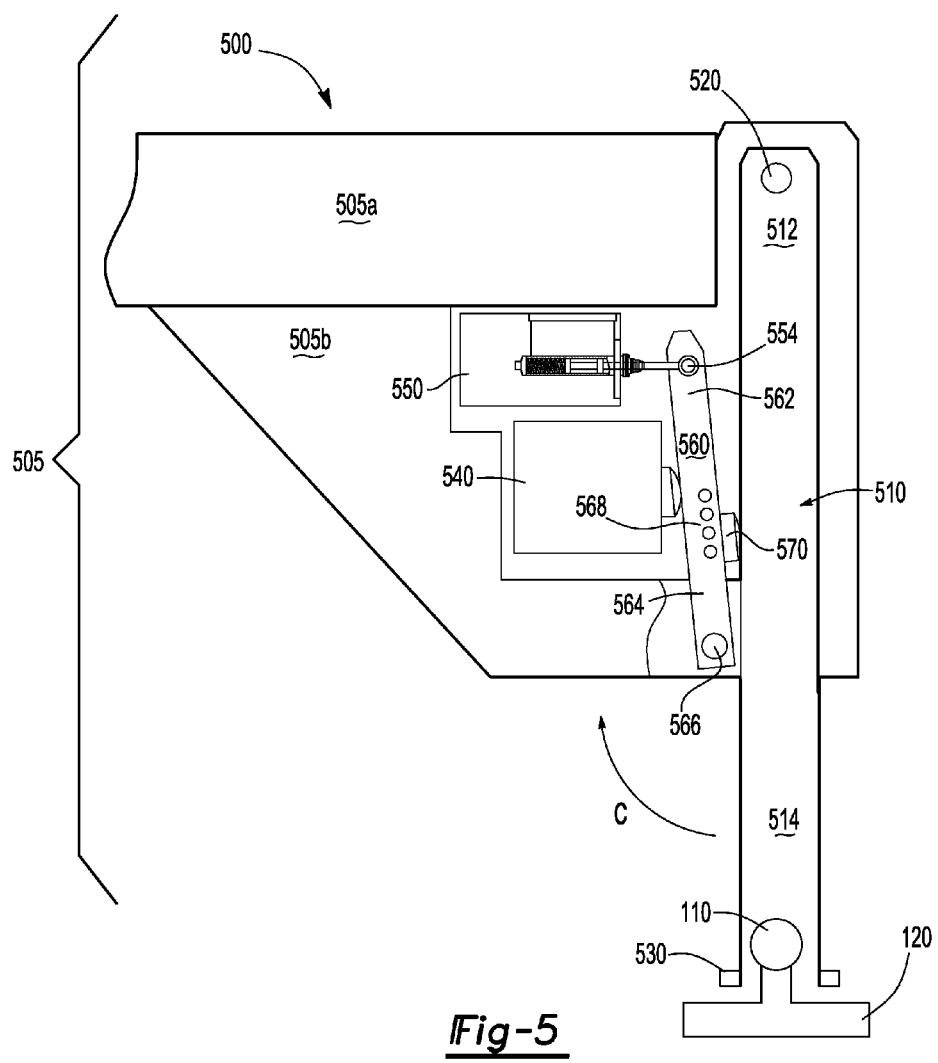
FIG. 5 illustrates another trailer braking system having a surge brake actuator in accordance with embodiments of the present invention.
Figure 6:
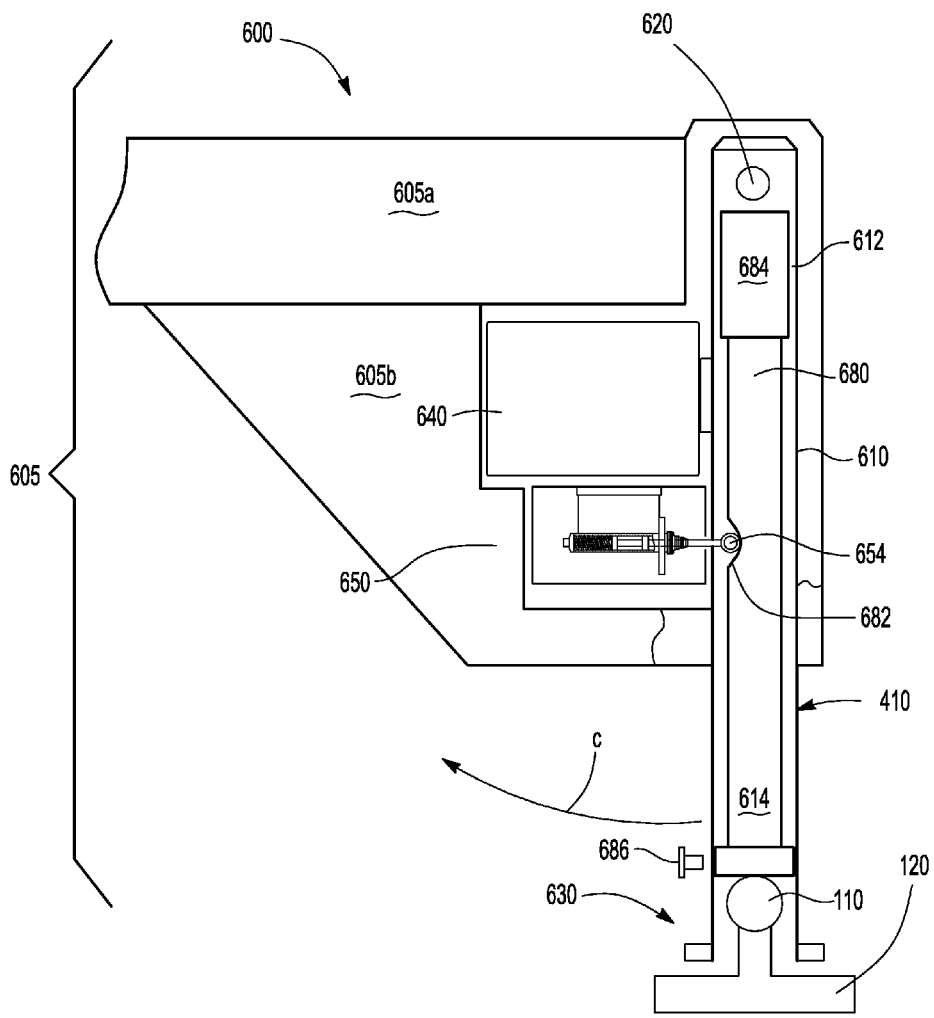
FIG. 6 illustrates yet another trailer braking system having a surge brake actuator in accordance with embodiments of the present invention.

FIGS. 4-6 illustrate the construction of the various trailer braking systems having a surge brake actuator in accordance with embodiments of the present invention. While a gooseneck hitch is shown in the figures, it will be appreciated that the trailer may be similarly configured for use with a fifth wheel plate or other hitch in one or more embodiments.

Figures 3A, 3B:
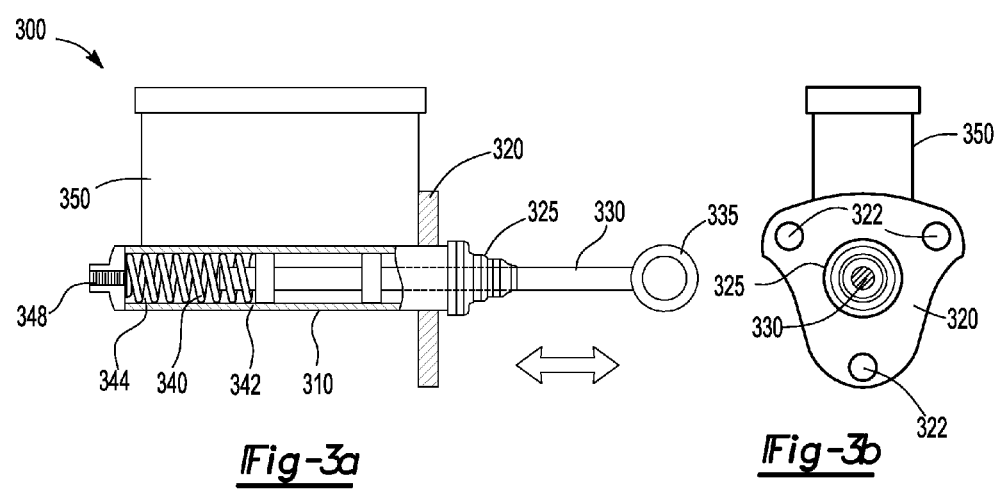
FIGS. 3(a) and (b) illustrate a surge brake actuator of a braking system in accordance with embodiments of the present invention.

FIGS. 3(a) and 3(b) illustrate a surge brake actuator 300 of a braking system in accordance with embodiments of the present invention. In particular, FIGS. 3(a) and 3(b) illustrate a side view and front view of the surge brake actuator 300, respectively.

The surge brake actuator 300 may be a relatively simple hydraulic brake system from both an operational and installation perspective. As shown, the surge brake actuator 300 generally includes a body 310, a mounting plate 320, a push rod 330, a master cylinder assembly 340, and a fluid reservoir 350.

The push rod 330 is configured to slide in a direction D inwardly and outwardly relative to the housing 310. A coupling 335 may be provided at the external end of the push rod 330 for coupling with an element (e.g., an arm member or a lever arm) of the trailer braking system via a pivotal connection, such as a pivot pin.

One or more mounting holes 322 in the mounting plate 320 allow the surge brake actuator 300 to be mounted to a frame of the upper portion 240 of the trailer 200 by welding, with fasteners (e.g., bolts), or the like. A flexible, removable seal 325 may be positioned between push rod 330 and the mounting plate 320 to prevent dirt and debris from entering the housing 310. And, one or more bushings or bearings (not shown) may also be provided to help reduce or suppress friction between moving parts.

The master cylinder assembly 340 generally includes a slideable piston 342 and cylinder 344 having a variable volume in fluid connection with the braking system of the trailer via a port 348. Movement of the push rod 330 causes movement of the piston 342 to increase or decrease the volume of the cylinder 344. The port 348 allows fluid to flow between the master cylinder assembly 340 and the trailer wheel brakes, for instance via a fluid conduit (not shown), to control the trailer wheel brakes. For hydraulic wheel brakes, movement of the piston 342 generates a corresponding hydraulic fluid pressure in the braking system. In particular, when the push rod 330 slides inwardly (i.e., to the left in FIG. 3(a)), the cylinder volume of the master cylinder assembly 340 compresses thereby increasing the fluid pressure output to the trailer wheel brakes. Conversely, when the push rod 330 slides outwardly (i.e., to the right in FIG. 3(a)), the cylinder volume of the master cylinder 340 assembly expands thereby decreasing the fluid pressure provided to the trailer wheel brakes.

The master cylinder assembly 340 may be configured to control output of fluid pressure to the trailer wheel brakes. The fluid pressure output may be substantially proportional to the rate of deceleration of the tow vehicle and the mass of the trailer, for example.

As shown, the push rod 330 may be directly connected to or coupled with the piston 342 of the master cylinder assembly 340. Although, it will be appreciated that the push rod 330 might also be coupled to the piston 342 of the master cylinder 340 in other ways, such as, for example, via a pulley, linkage, lever, pitman, gear, or the like, to transfer movement and force there between. In some embodiments, the surge brake actuator 300 might further include a spring to bias the push rod 330 in one direction (e.g., outwardly), a shock absorber configured to dampen sudden movement (such as jolts) that the surge brake actuator may experience, or both.

The fluid reservoir 350 stores fluid and is fluidly connected to the master cylinder assembly 340. Excess hydraulic fluid may be stored here when not being provided to the trailer wheel brakes.

In some instances, a commercially-available actuator may be modified for use with one or more braking system embodiments of the present invention. For example, the surge brake actuator may be a modified DEMCO Model DA10 actuator available from Dethmers Manufacturing Co. (Boyden, Iowa). The Model DA10 actuator has a maximum load rating of about 12,500 lbs. GWVR and 1,000 lbs. load limit. Basic modification of the Model DA10 actuator may include removing the conventional hitch coupler and sliding frame element, and adding a push rod to the assembly and adapting the mounting plate for attachment to the upper portion of a trailer in accordance with embodiments of the present invention. Further modifications may be necessary for various applications as desired. By using a commercially-available actuator, its safety and operational features may also be implemented in the trailer braking systems of the present invention.

FIG. 4 illustrates a trailer braking system 400 having a surge brake actuator in accordance with embodiments of the present invention.

The trailer braking system 400 generally includes an arm member 410, a pivot pin 420, a hitch coupler 430, a motion resistance assembly 440, and a surge brake actuator 450.

As shown, the trailer braking system 400 may be included with, and/or integrated in an upper portion 405 of a trailer which is to be pulled by a tow vehicle. The upper portion 405 may include a frame construction, including rails, struts, and/or beams with side wall or rails. The various frame members may be coupled together by welding, with fasteners (e.g., bolts) or the like. Here, for example, the upper portion 405 of the trailer may include a top member 405a and side members 405b (one shown). Additional or fewer frame members might be provided, and the construction of the trailer may be different from what is shown.

The arm member 410 may be an elongated element that includes an upper end 412 and a lower end 414 which pivotally connects to the upper portion 405 of the trailer. The arm member 410 may be solid, hollow, or partially-hollow depending on weight and/or strength requirements. In some embodiments, the arm member 410 may have a circular cross-section, although other cross-sectional shapes may also be possible.

The upper end 412 of the arm member 410 extends downward from and is pivotally connected to the upper portion 405 of the trailer by the pivot pin 420. The pivot pin 420 may be supported by side members 405b on at least one of its ends. This allows the arm member 410 to be supported by the pivot pin 420 between at least one of the side members 405b and to pivot. To reduce friction at the pivot point, a bushing or a bearing device can support the pivot pin 420 with respect to the upper portion of the trailer, the arm member, or both. Alternatively, the arm member 410 could also be pivotally connected to the upper portion 405 by a hinge, clevis, ball-and-socket joint, or the like, which enables pivotal movement there between.

The lower end 414 of the arm member 410 extends downward and outward from the upper portion 405 of the trailer and is adapted to couple to the tow vehicle. The lower end 414 may include a hitch coupler 430 that is configured to releaseably couple to a hitch 10 that is mounted to a plate 20 on the tow vehicle. The hitch 10 may be a hitch ball, fifth wheel plate, or the like.

The motion resistance assembly 440 is configured to resist motion and/or stabilize sudden motion (such as jolts). The motion resistance assembly may include a moveable portion 442 and a stationary body portion 444. The motion resistance assembly 440 may include a spring 446, a shock absorber 448, or both. The spring 446 may be an automotive coil spring and the shock absorber 448 may be a heavy-duty automotive shock absorber, for example. The moveable portion 442 of the motion resistance assembly 440 contacts the arm member 410. For instance, the moveable portion 442 may simply be capable of being in touching-contact with the arm member 410 for transferring motion or force; although, in some embodiments, the moveable portion 442 could be coupled to the arm member 410 via a pivot connection to accomplish that purpose.

When there is no relative motion or differential forces between the trailer and the tow vehicle, the spring 446 of the motion resistance assembly 440 is configured to urge the pivotally arm member 410 to be held in a generally vertical position to prevent undue motion between the trailer and the tow vehicle.

The surge brake actuator 450 is configured to control braking of the trailer wheels. In various embodiments, the surge brake actuator 450 may be configured as the surge brake actuator 300 shown in FIG. 3. Here, the push rod 452 of the surge brake actuator 450 pivotally couples with the arm member 410 via a pin member 454. The surge brake actuator 450 may include a master cylinder assembly 458 which controls fluid flow to the trailer wheel brakes. Movement of the push rod 452 may cause similar movement of the master cylinder assembly 458. Fluid flows between the master cylinder assembly 458 and trailer wheel brakes for instance via a fluid conduit (not shown) to control the trailer braking system.

When the tow vehicle decelerates, the inertial force caused by forward momentum of the trailer urges the upper portion 405 of the trailer to move forward relative to the tow vehicle. This inertial force pivots the arm member 410 in a rotational direction C such that the push rod 452 is urged toward the body 456 of the surge brake actuator 450 and force is exerted on the surge brake actuator 450. The master cylinder assembly 458 in turn outputs fluid to the trailer wheel brakes for braking the wheels of the trailer. The greater the pivoting of the arm member 410, the greater the force applied to the surge brake actuator 450 to control braking of the trailer. The brake actuator 450 may be pivotally mounted to the upper portion 405 of the trailer to accommodate the arc direction C.

Under resistance to forward motion of the trailer, the spring 446 of the motion resistance assembly 440 is compressed with the application of force to the surge brake actuator 450. When force is removed from the surge brake actuator 450, the spring 446 of the motion resistance assembly 440 urges the arm member 410 back to the vertical position. The maximum extent of pivotal movement of the arm member 410 in the direction opposite to direction C past the vertical position may be limited, for example, using a stop, block, bar, detent or other motion limiting device.

The motion resistance assembly 440 and the surge brake actuator 450 may be mounted to the upper portion 405 of the trailer, for example, by welding, with fasteners (e.g., bolts), or the like. For instance, a mounting plate (e.g., mounting plate 320) may be provided for this purpose.

In FIG. 4, the motion resistance assembly 440 is shown in a position closer to the pivotally connected upper end 412 of the arm member 410 than the surge brake actuator 450. However, it should be appreciated that in other embodiments, this arrangement could be reversed with the surge brake actuator 450 being in a position closer to the pivotally connected upper end 412 of the arm member 410 than the motion resistance assembly 440.

FIG. 5 illustrates a trailer braking system 500 having a surge brake actuator in accordance with embodiments of the present invention.

Various elements of trailer braking system 500 may be similarly configured as trailer braking system 400 and thus will not be further described in great detail here (unless otherwise described below). In particular, in trailer braking system 500, an arm member 510, a pivot pin 520, a hitch coupler 530, a motion resistance assembly 540, and a surge brake actuator 550 may be similarly configured as the arm member 410, the pivot pin 420, the hitch coupler 430, the motion resistance assembly 440, and the surge brake actuator 450, respectively, of trailer braking system 400. In addition, trailer upper portion 505 may be similarly configured as trailer upper portion 405.

However, unlike in the braking system 400 illustrated in FIG. 4, where the motion resistance assembly 440 and the surge brake actuator 450 directly couple with the arm member 410, the trailer braking system 500 illustrated in FIG. 5 further includes a lever arm 560 coupled to the motion resistance assembly 540 and the surge brake actuator 550.

The lever arm 560 may be an elongated element that includes an upper end 562 and a lower end 564. The upper end 562 of the lever arm 560 pivotally connects to the moveable portion of the motion resistance assembly 540 and/or the push rod of the surge brake actuator 550 with a pivot pin 554. The lower end 564 of the lever arm 560 pivotally connects to the upper portion 505 of the trailer with a pivot pin 566. Here, the lower end 564 of the lever arm 560 pivotally connects to the upper portion 505 of the trailer. However, it should be appreciated that the upper end 562 of the lever arm 560 might be pivotally connected to upper portion 505 of the trailer or to another element instead, in other embodiments.

A contact element 570 may be further provided on the arm member 510 or the lever arm 560 to contact the other of the arm member 510 or the lever arm 560. Here, the contact element 570 is shown provided on the lever arm 560 for contacting the arm member 510. The arm member 510 or the lever arm 560 which is provided with the contact member 570 may further include a plurality of predetermined locations for select placement of the contact element 570. For example, as shown in FIG. 5, the lever arm 560 is provided with a plurality of placement locations 568 for the contact member 570. The contact member 570 may simply be capable of being in touching-contact with the arm member 510; although, in some embodiments, the contact element 570 could be coupled to the arm member 510 and the lever arm 560 via a pivotal connection such as a pivot pin.

Movement of the arm member 510 causes pivotal movement of the lever arm 560 via the contact member 570. The contact element 570 may be coupled to the arm member 510 or the lever arm 560 using a bolt, a clamp, a releasable pin, or the like.

The lever arm 560 enables more precise adjustment to be made for better braking action of the trailer, and may further increase mechanical advantage and/or lower stresses on certain elements in various embodiments. For example, the placement of the contact member 570 relative to the other elements allows for adjustments to be made for optimal braking action of the trailer. As shown, the plurality of placement locations 568 may be holes. However, slots, recesses, clamping locations, or the like, might also be used for the same purpose. One or more additional lever arms may be further provided to increase mechanical advantage and/or lower stresses on elements in various embodiments also.

FIG. 6 illustrates a trailer braking system 600 having a surge brake actuator in accordance with embodiments of the present invention.

Various elements of trailer braking system 600 may be similarly configured as trailer braking system 400 and thus will not be further described in great detail here (unless otherwise described below). In particular, in trailer braking system 600, an arm member 610, a pivot pin 620, a hitch coupler 630, a motion resistance assembly 640, and a surge brake actuator 650 may be similarly configured as the arm member 410, the pivot pin 420, the hitch coupler 430, the motion resistance assembly 440, and the surge brake actuator 450, respectively, of trailer braking system 400. In addition, trailer upper portion 605 may be similarly configured as trailer upper portion 405.

The trailer braking system 600 further provides an additional safety feature for engaging the trailer wheel brakes when the trailer is not hitched to the tow vehicle. The trailer braking system 600 may further include a rod member 680 which translates with respect to the arm member 610. For example, the rod member 680 may be configured to slide within the confines of the arm member 610, as shown, or configured to slide fully or partially externally from the arm member 610. The rod member 680 may be an elongated element and may have a shape, size, or both that generally correspond to the arm member 610, in some embodiments.

As shown, the rod member 680 may include a cam surface 682 that engages a corresponding follower element 654 coupled to the external end of the push rod of the surge brake actuator 650. The follower element 654 may include a pivot pin that slides in a track or slot of the rod member 680 defining the cam surface 682, for instance.

The cam surface 682 and follower element 654 are configured to selectively enable braking action of the trailer braking system 600 by sliding movement of the rod member 680. As the rod member 680 translates with respect to the arm member 610 the cam surface 682 causes the follower element 654 to slide thereto. This action controls sliding movement of the push rod of the surge brake actuator 650 independently of pivotal motion of the arm member 610.

In some embodiments, as shown, the cam surface 682 may have a generally U- or V-profile with an inwardly-indented bottom surface and outwardly ramping surfaces. For instance, when the rod member 680 is in a first position (i.e., not coupled to the hitch of the tow vehicle), the ramped surface of the cam surface 682 of the rod member 680 engages the follower element 654 so as to push or urge the push rod of the surge brake actuator 650 inward. This results in large pressure being output by the master cylinder assembly and therefore a large pressure being initially applied to the trailer wheel brakes. This pressure can fully clamp the wheel brakes of the trailer.

Conversely, when the rod member 680 is in a second position (i.e. coupled to the hitch of the tow vehicle as shown in FIG. 6), the inwardly-indented bottom surface of the cam surface 682 engages follower element 654 so as to draw or pull the push rod of the surge brake actuator 650 outward. This results in little to no pressure being output by the master cylinder assembly and therefore little to no pressure being initially applied to the trailer wheel brakes. Additional force can be exerted on the surge brake actuator 650, and in turn to the trailer wheel brakes, when the arm member 610 pivots similar to the trailer braking system 400.

A spring 684 may be positioned between the rod member 680 and the arm member 610 to bias the rod member 680 toward the hitch 10 of the tow vehicle (i.e., in the first position). The spring 684 may be a 400 lb. coil spring, for example, in one embodiment. The spring 684 may cause the surge brake actuator 650 to be applied by default to engage the trailer wheel brakes to prevent the trailer wheel from rolling when the trailer is not coupled to the hitch 110 of the tow vehicle.

In addition, a releasable pin 686 may be provided for locking the position of the rod member 680 with respect to the arm member 610. For example, after the arm member 610 couples to the hitch 10 of the tow vehicle (i.e., urging the rod member 680 into the second position), the pin 686 can be inserted into corresponding holes in the arm member 610 and rod member 680 to lock the rod member 680 in that position. The pin member 686 may be a cotter pin, bolt, bayonet coupling, or the like, for example. The safety feature of trailer braking system 600 may be incorporated into various embodiments of the present invention.

Elements of the various trailer braking systems described herein may be fabricated from any suitable materials, such as steel, aluminum, wood, or the like.

As should also be appreciated, no special modifications or added equipment is generally needed to be installed on the tow vehicle to couple with a trailer equipped with a trailer braking system in accordance with various embodiments. Thus, almost any properly sized, powered tow vehicle having a suitable hitch can be used to pull the trailer equipped with the trailer braking system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

NUMBER KEY

100 hitch system
110 hitch ball
120 frame rails
140 trailer
145 arm member
150 tow vehicle
200 trailer
210 bed
220 wheels
222 brakes
240 arm member
245 hitch coupler
250 upper portion
300 surge brake actuator
310 body
320 mounting plate
322 mounting holes
325 seal
330 push rod
335 coupling
340 master cylinder assembly
342 piston
344 cylinder
348 port
350 fluid reservoir
400 braking system
405 upper portion
405a top member
405b side member
410 arm member
412 upper end
414 lower end
420 pivot pin
430 hitch coupler
440 motion resistance assembly
442 movable portion
444 body portion
446 spring
450 brake actuator
452 push rod
454 pin member
456 body
458 master cylinder assembly
500 trailer braking system
505 upper portion
510 arm member
520 pivot pin
540 motion resistance assembly
550 brake actuator
560 lever arm
562 upper end
564 lower end
566 pivot pin
568 placement locations
570 contact element
600 braking system
610 arm member
620 pivot pin
630 hitch coupler
640 motion resistance assembly
650 brake actuator
654 follower element
680 rod member
682 cam surface
684 spring
686 pin

I claim:

1. A braking system for a trailer pulled by a tow vehicle, the braking system comprising:
    an arm member extending downward from and pivotally connected to an upper portion of the trailer;
    a surge brake actuator coupled to the upper portion of the trailer that is configured to control braking of wheels of the trailer; and
    a lever arm pivotally connected to the surge brake actuator, wherein, when the tow vehicle decelerates, inertial force caused by forward momentum of the trailer pivots the arm member such that force is exerted on the surge brake actuator.

2. The braking system according to claim 1, wherein the surge brake comprises a push rod and a master cylinder assembly, and movement of the push rod moves the master cylinder assembly.

3. The braking system according to claim 2, wherein the master cylinder assembly is configured to output fluid pressure to the trailer wheel brakes which is substantially proportional to the rate of deceleration of the tow vehicle and the mass of the trailer.

4. The braking system according to claim 2, wherein an external end of the push rod connects to another element of the braking system via a pivotal connection.

5. The braking system according to claim 1, further comprising a hitch coupler positioned at an end of the arm member configured to releaseably couple to a hitch ball or a fifth wheel plate attached to the tow vehicle.

6. The braking system according to claim 1, further comprising a pivot pin to pivotally connect the arm member to the upper portion of the tow vehicle.

7. The braking system according to claim 1, further comprising a motion resistance assembly configured to resist motion and/or stabilize sudden motion between the trailer and the tow vehicle.

8. The braking system according to claim 7, wherein the motion resistance assembly comprises a spring, a shock absorber, or both.

9. The braking system according to claim 7, wherein the surge brake actuator is positioned closer to the pivotally connected portion of the arm member than the motion resistance assembly.

10. The braking system according to claim 7, wherein the motion resistance assembly is positioned closer to the pivotally connected portion of the arm member than the surge brake actuator.

11. The braking system according to claim 1, wherein a portion of the lever arm pivotally connects to the upper portion of the trailer.

12. The braking system according to claim 1, further comprising a contact element provided on the arm member or the lever arm, wherein the arm member or the lever arm provided with the contact element further comprises a plurality of locations for attachment of the contact element thereto.

13. A method for braking a trailer pulled by a tow vehicle, the trailer having the braking system according to claim 1 comprising:

decelerating the tow vehicle, wherein inertial force caused by forward momentum of the trailer pivots the arm member and force is exerted on the surge brake actuator.

14. A braking system for a trailer pulled by a tow vehicle comprising:
an arm member extending downward from and pivotally connected to an upper portion of the trailer;
a surge brake actuator coupled to the upper portion of the trailer that is configured to control braking of wheels of the trailer; and
a rod member that translates parallel to a longitudinal axis of the arm member,
wherein, when the tow vehicle decelerates, inertial force caused by forward momentum of the trailer pivots the arm member such that force is exerted on the surge brake actuator.

15. The braking system according to claim 14, wherein the rod member comprises a cam surface that engages a follower element connected to one end of the push rod of the surge brake actuator.

16. The braking system according to claim 15, wherein as the rod member translates relative to the arm member, the follower element engages the cam surface such that, (i) in a first position, the push rod of the surge brake actuator is pushed inward, and (ii) in a second position, the push rod of the surge brake actuator is pulled outward.

17. The braking system according to claim 16, further comprising a spring to bias the rod member into the first position.

18. The braking system according to claim 14, a releasable pin for locking the position of the rod member with respect to the arm member.

19. The braking system according to claim 14, further comprising a hitch coupler positioned at an end of the rod member configured to releaseably couple to a hitch ball or a fifth wheel plate attached to the tow vehicle.

20. The braking system according to claim 14, wherein the rod member translates at least partially within the confines on the arm member.

* * * * *